United States Patent
Seguin et al.

(10) Patent No.: US 7,113,529 B2
(45) Date of Patent: Sep. 26, 2006

(54) PULSED $CO_2$ LASER INCLUDING AN OPTICAL DAMAGE RESISTANT ELECTRO-OPTICAL SWITCHING ARRANGEMENT

(75) Inventors: Vernon Seguin, Windsor, CT (US); Leon Newman, Glastonbury, CT (US); R. Russel Austin, Half Moon Bay, CA (US); Anthony DeMaria, West Hartford, CT (US)

(73) Assignee: Coherent, Inc., Santa Clara, CA (US)

( * ) Notice: Subject to any disclaimer, the term of this patent is extended or adjusted under 35 U.S.C. 154(b) by 112 days.

(21) Appl. No.: 10/389,158

(22) Filed: Mar. 14, 2003

(65) Prior Publication Data

US 2004/0179775 A1    Sep. 16, 2004

(51) Int. Cl.
*G02H 6/26*    (2006.01)
(52) U.S. Cl. .......................................... 372/39; 385/31
(58) Field of Classification Search ................. 372/39
See application file for complete search history.

(56) References Cited

U.S. PATENT DOCUMENTS

| | | | | |
|---|---|---|---|---|
| 3,593,188 A | * | 7/1971 | Nussmeier | 372/26 |
| 4,075,385 A | * | 2/1978 | Baer et al. | 428/215 |
| 5,680,412 A | * | 10/1997 | DeMaria et al. | 372/92 |
| 6,192,061 B1 | | 2/2001 | Hart et al. | 372/87 |
| 2003/0081636 A1 | | 5/2003 | Wang | 372/10 |
| 2003/0156615 A1 | * | 8/2003 | Kennedy et al. | 372/55 |

* cited by examiner

*Primary Examiner*—James Vannucci
(74) *Attorney, Agent, or Firm*—Stallman & Pollock LLP

(57) ABSTRACT

An electro-optical switch includes an optical assembly arranged to transmit laser-radiation. The optical assembly comprises an active optical crystal. On one of two opposite surfaces of the crystal is an optical window formed from a material having a refractive index lower than the material of the crystal. Heat deposited, as a result of transmission of the laser-radiation, at the surface of the crystal in contact with the widow is transferred to the window, thereby reducing the potential for optical damage to the crystal surface. The window is sufficiently thick that it has an odd integer multiple of quarter-wavelengths optical thickness at a wavelength about equal to a wavelength of the laser-radiation, thereby behaving as an antireflection device for the crystal at that wavelength. In one embodiment of the optical assembly, the active optical crystal is a cadmium telluride crystal and the window is formed from cesium bromide.

21 Claims, 10 Drawing Sheets

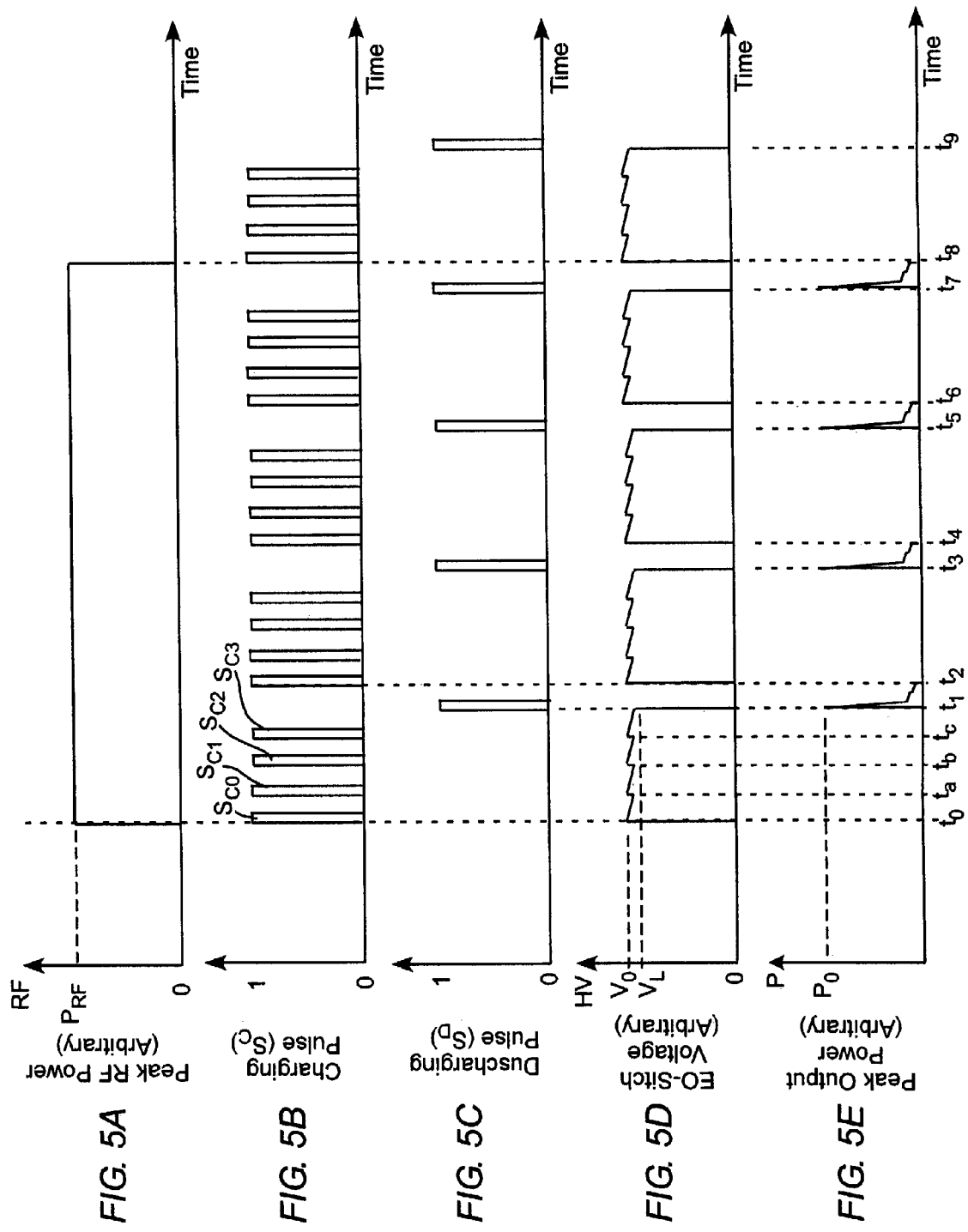

PULSED CO₂ LASER INCLUDING AN OPTICAL DAMAGE RESISTANT ELECTRO-OPTICAL SWITCHING ARRANGEMENT

TECHNICAL FIELD OF THE INVENTION

The present invention relates generally to Q-switched pulsed lasers. It relates in particular to a Q-switched pulsed carbon dioxide ($CO_2$) laser including a Q-switching arrangement configured to reduce optical damage to components thereof.

DISCUSSION OF BACKGROUND ART

Q-Switched pulsed waveguide $CO_2$ lasers are commonly used in material processing operations. Many of these operation require laser-radiation pulses delivered by the lasers to have high peak power, for example about 25 Kilowatts (KW) or greater, with peak instantaneous power intensity of several Megawatts per square centimeter ($MW/cm^2$).

Such a high peak-power intensity can rapidly cause damage to optical components inserted within the laser cavity, in particular to those components configured to perform the Q-switching function. A consequence of this is that laser operational time may be limited to between 100 to 1000 hours before one or more components need to be replaced. Another consequence of this is that damage to components limits the reliable power output of a laser rather than other aspects of the laser, such as resonator design, cooling arrangements or the like.

FIG. 1A and FIG. 1B schematically illustrate a prior-art, Q-switched, pulsed, $CO_2$ laser 20 including a laser resonator 22. Resonator 22 is terminated at one end thereof by a mirror 24 having a maximally reflecting coating 26, for example, a coating having a reflectivity of about 99.9% or greater. Resonator 22 is terminated at the opposite end thereof by a mirror 28 having a partially reflecting and partially transmitting coating 30, for example, a coating having a transmissivity of about 50% and a reflectivity of about 50%.

Included in resonator 22 is an arrangement 32 including the $CO_2$ gain-medium. Typically such an arrangement would comprise a ceramic slab including a zigzag array of channels or waveguides (not shown) for containing the gain-medium and fold mirrors (not shown) to direct laser-radiation through the channels. A detailed description of such a gain-medium arrangement is not necessary for understanding principles of the present invention. Accordingly, such a detailed description is not presented herein. A detailed description of a zigzag (folded) waveguide arrangement is provided in U.S. Pat. No. 6,192,061, the complete disclosure of which of hereby incorporated by reference. In the description presented below, this gain-medium arrangement is referred to simply as gain-medium 32.

In the gain-medium 32 as depicted in FIGS. 1A and 1B, the waveguides lie in the plane of the illustration, with electrodes (not shown) on opposite sides of the waveguides in planes parallel thereto. A radio-frequency (RF) potential is applied to one of the electrodes as depicted schematically in FIGS. 1A and 1B by a lead 34 and a terminal 36. The other electrode is typically grounded. An RF generator or source for providing the RF generator is not explicitly shown but is adequately represented by the symbol RF in FIGS. 1A and 1B and in other drawings of embodiments of the present invention discussed hereinbelow. Applying the RF potential energizes the gain-medium and generates laser-radiation. In this gain-medium arrangement, laser-radiation generated by the gain-medium is plane polarized, with the electric vector thereof in a plane parallel to the electrodes as illustrated by arrows $P_P$. The direction of travel of radiation in the resonator is indicated by horizontal arrows.

Included in laser resonator 22 is a prior-art Q-switch arrangement 38. Q-switch arrangement 38 includes a thin film polarizer 40, an electro-optical (E-O) switch 42, and a (45-degree) polarization rotator (quarter-wave plate or quarter-wave phase retarder) 44. E-O switch 42 includes an active element 46, usually in the form a crystal of cadmium telluride (CdTe). Crystal 46 is arranged with its optical axis at forty-five degrees to the orientation of $P_P$ polarization. A high DC voltage (HV) can be applied to CdTe crystal 46 via electrodes 48 and 49 when a switch 50 is closed. Switch 50 is depicted in an open condition in FIG. 1A, and in a closed condition in FIG. 1B. It should be noted, here, that switch 50, in practice, is an electrical component assembly arranged for pulse switching, but is depicted as a conventional single pole switch in FIGS. 1A and 1B for simplicity of illustration. A detailed description of such a pulse switching component assembly is provided further hereinbelow. End surfaces 46A of crystal 46, through which laser-radiation enters and leaves the crystal, are protected by zinc selenide (ZnSe) windows 52 held in thermal and effectively in optical contact therewith by clamps (not shown). Reflection from exposed surfaces of windows 52 is reduced by antireflection coatings 54. When switch 50 is closed, the high voltage is applied across electrodes 48 and 49, which causes crystal 46 to act as a quarter-wave polarization rotator. When there is no voltage across the crystal (switch 50 open) the polarization of radiation passing therethrough is unchanged.

The purpose of windows 52 is to protect entrance and exit surfaces from damage due to high intensity laser-radiation circulating in the resonator. The widows are clamped against the CdTe crystal, in thermal contact therewith by clamps (not shown) and such that any space between a window and the crystal is less than interference thickness. This reduces reflection losses at the interface therebetween to about the Fresnel reflection loss at an interface between a medium having the refractive index of ZnSe and a medium having the refractive index of CdTe. Additionally, as ZnSe has a much higher thermal conduction coefficient than CdTe, heat generated in the crystal is conducted away from the interface by the ZnSe window, thereby reducing damage at the CdTe crystal surfaces. A detailed description of an E-O switch such as switch 42 is provided in U.S. Pat. No. 5,680,412, assigned to the assignee of the present invention, and the complete disclosure of which is hereby incorporated by reference.

As is well known in the art, the function of Q-switch 38 is to restrict or inhibit circulation of laser-radiation through gain-medium 32 until the gain-medium is sufficiently energized to provide a radiation pulse of the desired power, and then allow radiation to circulate through the medium and build up in intensity, thereby releasing the output pulse through partially transmitting mirror 28. The manner in which this is accomplished by Q-switch 38 is described below with continuing reference to FIGS. 1A and 1B.

Referring first to FIG. 1A, wherein switch 50 is open, laser-radiation polarized in orientation $P_P$ leaving gain-medium 32 is transmitted through thin film polarizer 40 and through E-O switch 38 with polarization unchanged. The radiation then passes through quarter-wave phase retarder 44, which converts the plane-polarized radiation to circularly polarized radiation $P_C$. The circularly polarized radiation is reflected from mirror 26 and the direction of circularity is reversed as indicated by arrow $P_{C'}$. Circularly polarized radiation $P_C$, then passes through quarter-wave polarization rotator 44 which converts the circularly polarized radiation to plane polarized radiation with an orientation (electric vector) perpendicular to that of radiation $P_P$, as indicated by arrow-tip $P_S$. Radiation $P_S$ passes through E-O switch 38 with polarization unchanged. The radiation is reflected by thin film polarizer 40 out of resonator 22. Accordingly, it is not possible for radiation to circulate through energized gain-medium 32 and build in intensity.

Referring next to FIG. 1B, after a predetermined time has been allowed to energize gain-medium 38, switch 50 is closed, causing crystal 46 to act as a polarization rotator as discussed above. As a consequence of this, plane polarized radiation $P_P$ passing through the crystal is now converted to circularly polarized radiation $P_C$. Circularly polarized radiation $P_C$ passes through polarization rotator 44 and is converted to plane-polarized radiation $P_S$. Plane-polarized radiation $P_S$ is reflected from mirror 24 through polarization rotator 44 and is converted thereby to circularly polarized radiation $P_C$. The circularly polarized radiation $P_C$ is then converted by crystal 46 to plane-polarized radiation $P_P$. The plane polarized radiation $P_P$ is transmitted by thin film polarizer 40 and passes through gain-medium 32. A fraction of the radiation is transmitted by mirror 28 and the remainder is reflected by mirror 28 back through energized gain-medium 32, building in intensity as a result. The intensified radiation then undergoes the aforementioned sequence of polarization changes and returns again to mirror 28.

In this way, laser-radiation is released through partially transmissive mirror 28, initially, as an intense radiation pulse of relatively short duration, for example about 150 nanoseconds (ns). If switch 38 remains closed, the power of the pulse then decays gradually toward some continuous wave (CW) level, which may be several orders of magnitude less than the peak power. In order to generate another laser-radiation pulse, switch 50 must be opened to prevent circulation of radiation as described above, thereby allowing the gain-medium to be reenergized.

In prior-art such lasers, typically, RF power is applied to gain-medium 32 continuously. Laser energy will not be delivered until switch 50 is closed. In many applications of such lasers, laser-radiation pulses are delivered in sequences ("trains" or "bursts") of between about two and ten or more pulses, with the time interval between pulses being ten or more times longer than the duration of an individual pulse. The pulse-repetition frequency (PRF) of individual pulses in a burst may be between about thirty kilohertz (30 KHz) and 100 KHz. Bursts of pulses may be repeated at a frequency of 1 KHz or greater.

Those skilled in the art will recognize without further illustration that quarter-wave phase-retarder 44, (here transmissive) may be replaced with a reflective phase retarder (RPR) arranged at an angle to incident radiation, with mirror 24 being correspondingly arranged to receive radiation reflected from the RPR and reflect that radiation back to the RPR along its incident path. Those skilled in the art will also recognize that mirror 28 may be replaced by a fully reflective mirror and laser-radiation delivered from the resonator, after a predetermined circulation time therein, by reclosing switch 50, thereby causing the radiation built up in the resonator to be reflected out of the resonator by thin film polarizer 40 in a $P_S$ polarization orientation. This is usually termed a "cavity-dumped" mode of operation.

Whatever the phase retarder arrangement or operation mode, components of Q-switch arrangement 38 are prone to optical damage by radiation build up in the laser resonator. Typically, phase retarder 44 (or a reflective equivalent) is the most likely or the first component to be damaged. Antireflection coatings 54 are the next most likely, or the next components to be damaged. It is an object of the present invention to eliminate one or more of these components and preferably to protect any remaining components from optical damage.

SUMMARY OF THE INVENTION

The present invention is directed to reducing optical damage to an electro-optical switch used in a pulsed Q-switched laser. In one aspect of the invention the optical switch includes an optical assembly arranged to transmit laser-radiation. In one preferred embodiment, the optical assembly comprises an active optical crystal having first and second opposite surfaces, and first and second windows each thereof having first and second opposite surfaces. The second surface of the first window is in thermal contact with the first surface of the active optical crystal, and the first entrance surface of the second window is in thermal contact with the second surface of the active optical crystal. At least the first window is formed from a material having a refractive index between about 25% less than and 50% greater than the square root of the refractive index of the material of the active optical crystal.

The windows serve to transfer heat deposited at the surfaces of the optical crystal as a result of transmission of the laser-radiation therethrough. This reduces the potential for optical damage to the crystal surfaces by the radiation. The first window is sufficiently thick that it is an odd integer multiple of quarter-waves optical thickness at a wavelength close to the wavelength of the laser-radiation. Accordingly the window acts as a reflection-reducing device for the crystal surfaces at that wavelength.

In another embodiment of the inventive optical assembly, the second window is also formed from a material having a refractive index between about 25% less than and 50% greater than the square root of the refractive index of the material of the active optical crystal. In yet another embodiment of the inventive optical assembly the second window is formed from a material having a refractive index similar to the refractive index of the material of the active optical crystal.

In another aspect of the invention the optical assembly comprises an active optical crystal having first and second opposite surfaces, and first and second windows each thereof having first and second opposite surfaces. The second surface of the first window is in thermal contact with the first surface of the active optical crystal, and the first surface of the second window is in thermal contact with the second surface of the active optical. At least the first window is formed from a material having a refractive index similar to that of the material of the active optical crystal, and the first and second surfaces of the first window are inclined at an angle $\theta_w$ to each other, where $\theta_w$ is about equal to the Brewster angle in the material of the first window.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

FIGS. 5A-E are graphs schematically illustrating relative timing of pulsed RF pump-power, Q-switching signals, and resulting Q-switched laser-radiation pulses in another preferred mode of operating the Q-switch arrangement of FIGS. 2A and 2B.

DETAILED DESCRIPTION OF THE INVENTION

Figure 1A:
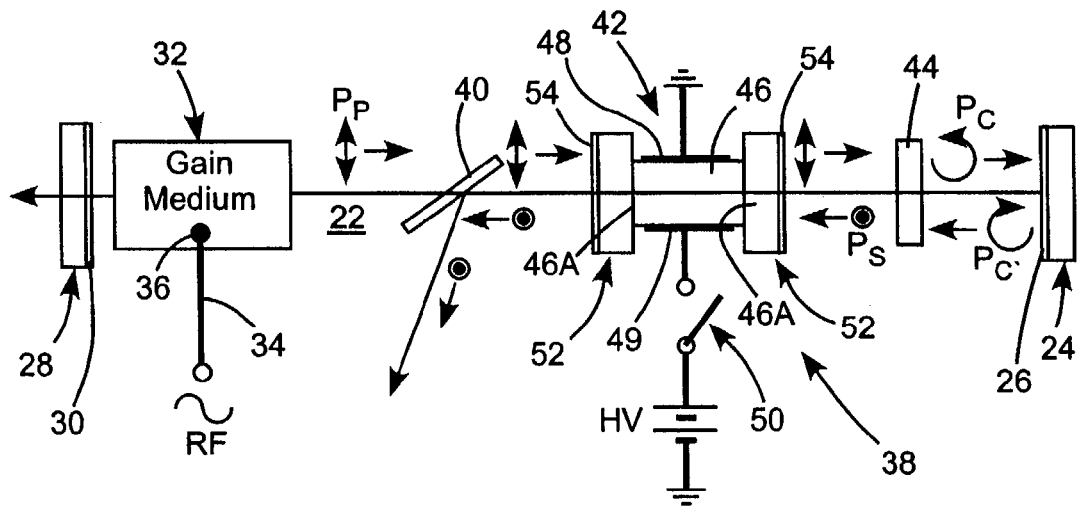
FIGS. 1A and 1B, schematically illustrate a prior art Q-switched $CO_2$ laser and a method of operating the laser, the laser having Q-switch arrangement including a CdTe E-O switch, a thin-film polarizer and a polarization rotator.
Figure 1B:
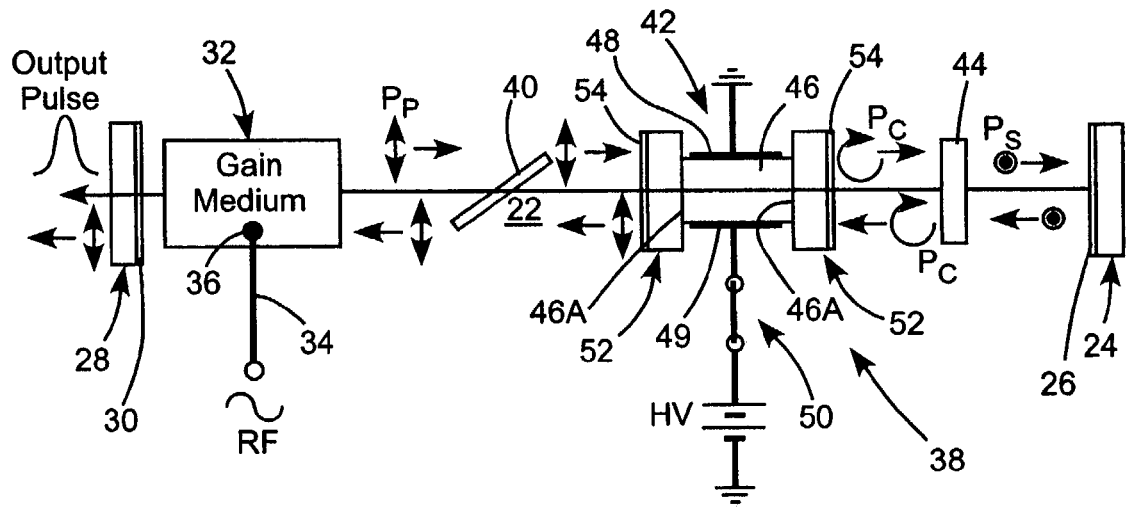
Figure 2A:
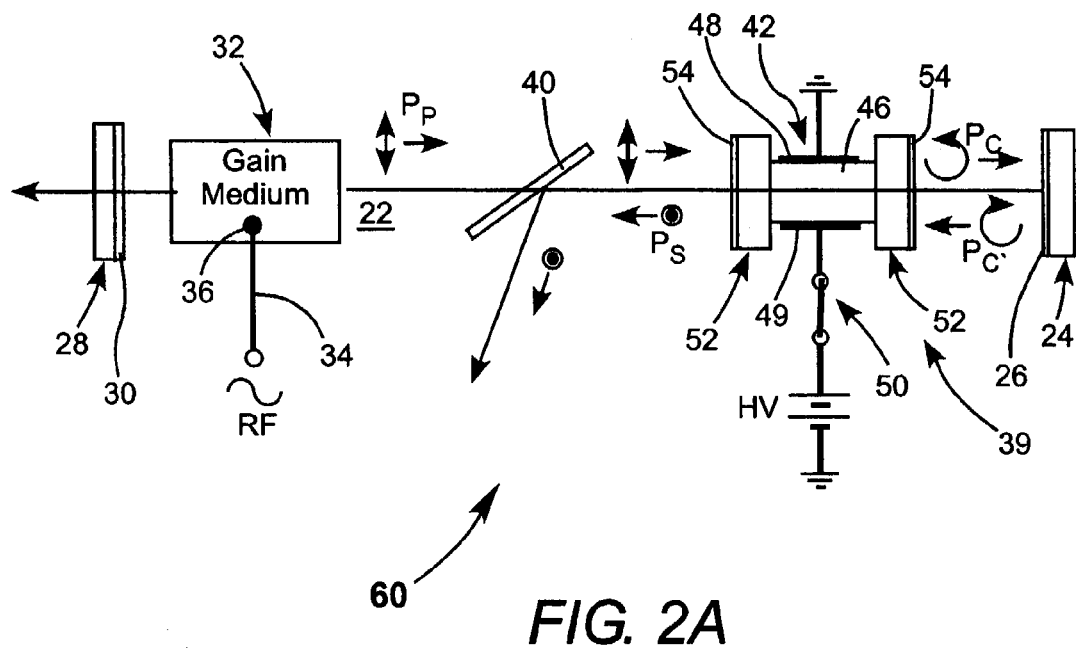
FIGS. 2A and 2B, schematically illustrate one preferred embodiment of a Q-switched $CO_2$ laser in accordance with the present invention and a method of operating the laser, the laser having a laser resonator formed between two mirrors, the resonator including a Q-switch arrangement including a CdTe E-O switch and a thin-film polarizer but not having a polarization rotator, and the CdTe E-O switch including two ZnSe windows each having an antireflection coated surface.
Figure 2B:
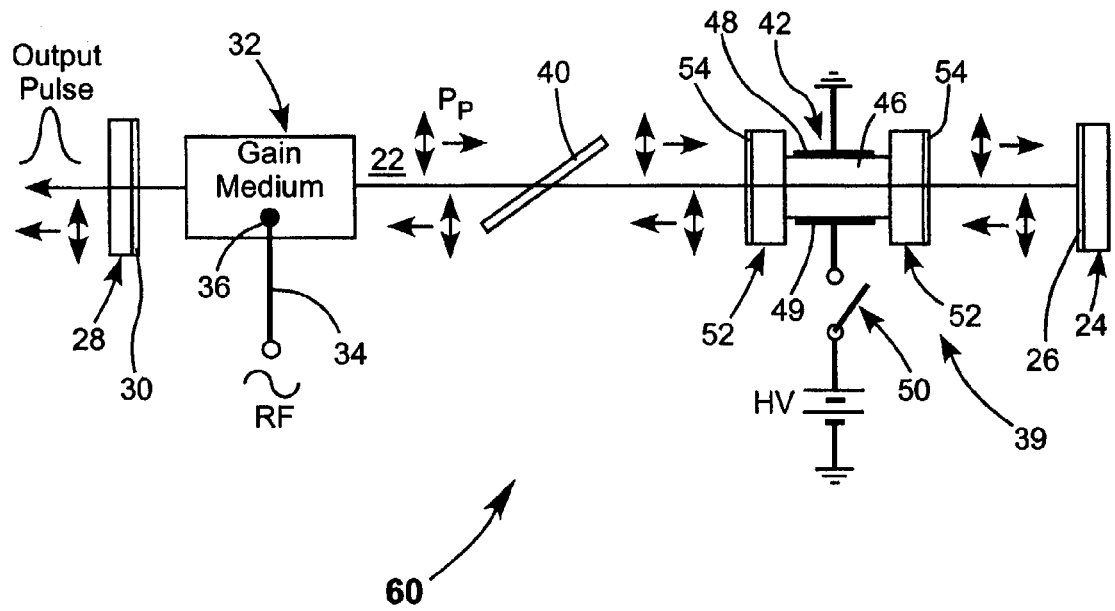

Turning now to the drawings, wherein like components are designated by like reference numerals, FIGS. 2A and 2B schematically illustrate one preferred embodiment 60 of a pulsed Q-switched laser in accordance with the present invention. Components of laser 60 are similar to those of laser 20 of FIG. 1, with an exception that laser Q-switch arrangement does not include a polarization rotator (quarter-wave phase retarder) 44. This is usually the component most susceptible to optical damage, as discussed above. In the absence of a quarter-wave phase retarder, if switch 50 is open and no voltage is applied to crystal 46 (see FIG. 2B), plane-polarized radiation $P_P$ from energized gain-medium 32 can circulate freely in resonator 22.

When switch 50 is closed (see FIG. 2A) crystal 46 acts as a quarter-wave phase retarder. Plane-polarized radiation $P_P$ from gain-medium 32 passes through crystal 46 and is converted to circularly polarized radiation $P_C$. Circularly polarized radiation $P_C$ is reflected from mirror 24 and converted to circularly polarized radiation $P_{C'}$ (direction of circularity reversed by the reflection). Circularly polarized radiation $P_{C'}$ again passes through crystal 46 and is converted to plane polarized radiation $P_S$. The plane-polarized radiation PS is reflected out of resonator 22 by thin film polarizer 40, thereby preventing the radiation from circulating in the resonator.

As discussed above, Q-switched pulses are generated by applying RF energy to gain-medium 32 while restricting circulation of radiation in the resonator until a predetermined energy level in the gain-medium is reached and then allowing circulation of radiation in the resonator, thereby delivering laser-radiation in the form of a high intensity pulse. In laser 60, circulation of radiation is restricted by establishing a high voltage across crystal 46. The crystal is arranged with its optical axis inclined at about forty-five degrees to the orientation of $P_P$ polarization.

It should be understood that the subject approach for generating pulses and the disclosed Q-switch embodiments might be used in other lasers besides carbon dioxide lasers.

For example, the subject invention could be used with solid state lasers that can be optically pumped by flashlamps or other lasers.

CdTe is a preferred material for electro-optical crystal 46 as noted above. However, this should not be construed as limiting the present invention. One disadvantage of CdTe crystals, is that they contain traces of impurities at very low concentration levels. The concentrations are so low that they are difficult to measure and thereby difficult to control in the crystal growing process. These impurities can adversely affect the performance of CdTe crystals in electro-optical Q-switching applications if a high voltage is maintained across the crystal for an extended time period, for example a few tenths of a second or more. By way of example, CdTe having a thickness of about 5 millimeters (mm) and length of about 50 mm requires an applied voltage of about 2.2 Kilovolts (KV) to provide half-wave polarization rotation for $CO_2$ laser-radiation having a wavelength of about 10.6 micrometers (μm). Under the influence of such a voltage, charge carriers are believed to move slowly through the crystal and become captured within unevenly distributed traps caused by the impurities. Besides being unevenly distributed, the size of the traps also varies.

The captured charges set-up their own DC bias (self-bias) within the crystal. Variations in this self-bias can cause variations in the phase retardation of radiation propagating through the crystal. The self-bias and consequently the phase retardation can vary with ambient temperature and with time. This, in turn, can lead to inconsistent and unpredictable operation of the Q-switch.

Elimination of the quarter-wave phase retarder in accordance with this disclosure is achieved by operating the Q-switch in a manner different from the prior art laser 20. More specifically, in laser 60, the Q-switch is activated when the laser output is to be suppressed and deactivated when laser output is desired. This change in operation could increase the time that voltage is applied to the crystal by up to about ten or more times longer over the prior art approach. Such an increase in activation time could lead to the problems discussed above.

These problems are avoided, however, by supplying RF power to gain-medium 32 in a pulsed form with the pulse duration being no longer than the duration of a burst of pulses. Operation of E-O switch 42 is synchronized with the RF power pulse to provide the desired burst of pulses. A description of the synchronization of electronic pulses for operating laser 60 is set forth below beginning with a description of a practical arrangement of switch 50.

Figure 3:
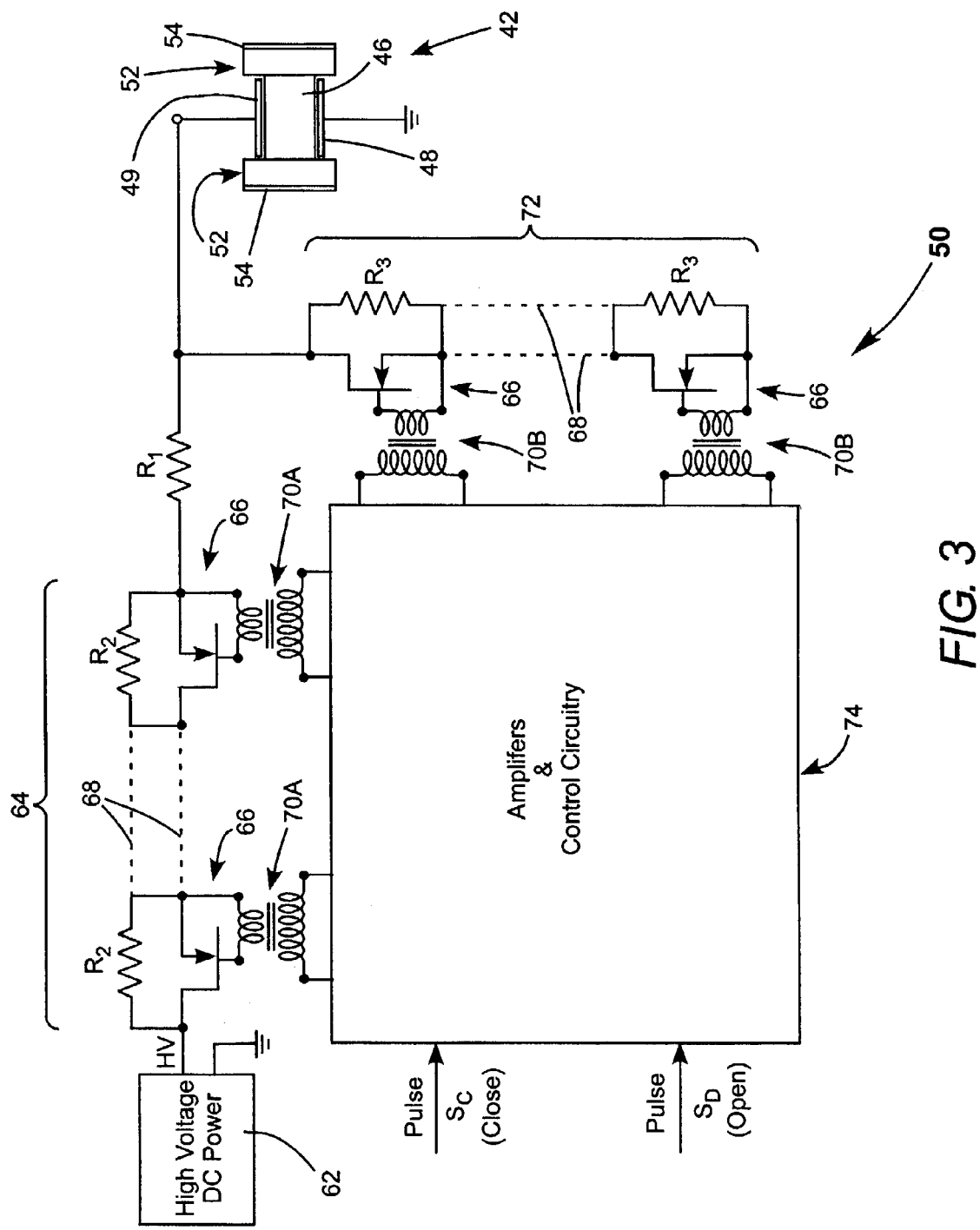
FIG. 3 schematically illustrates circuitry and components for operating the E-O switch of FIGS. 2A and 2B.

FIG. 3 schematically illustrates one preferred arrangement of components and connections providing the switching function of the above-discussed hypothetical switch 50. A DC power supply 62 providing a high voltage HV is connected to electrode 49 of optical switch 42 via a resistor $R_1$ and a totem pole switch 64 comprising a series of high voltage metal oxide silicon field effect transistors (MOSFETs) 66, connected in series, as indicated in FIG. 3 by dashed lines 68. Each MOSFET 66 is shunted by a resistor $R_2$ for swamping the MOSFET leakage current. The MOSFETs 66 are driven by toroidal ferrite pulse transformers 70A.

Preferably, totem-pole switch 64 includes five or six MOSFETs 66. The function of totem pole switch 64 is to apply the high voltage to E-O switch 42, i.e., to close the switch in the sense indicated in above-discussed FIGS. 1B and 2A. CdTe crystal 46, being sandwiched between electrodes 48 and 49 acts as a capacitor providing the electro-optical switch with an electrical capacitance. Accordingly applying the high voltage pulse can be defined as "charging" (the capacitance of) the E-Q switch. The voltage this established across electrodes 48 and 49 initially is at a maximum, corresponding to the applied voltage, then progressively decreases, due to leakage effects discussed further hereinbelow. When a voltage is established across electrodes 48 and 49 the switch is said to be in an activated state.

After switch 50 is "closed" by applying the high voltage as described above, it can be "opened" by rapidly discharging the capacitor formed by electrodes 48 and 49 and crystal 46, thereby effectively removing any established volatage across the electrodes. This is accomplished by a totem-pole switch 72, which can be operated to connect electrode 49 of E-O switch 42 to ground. This reduces the voltage across the electrodes effectively to zero. In this state the switch is referred to as deactivated. Totem-pole switch 72 preferably comprises the same number of series-connected MOSFETs 66 as totem pole switch 64. The MOSFETs are driven by toroidal pulse transformers 70B. MOSFETs 66 of totem-pole switch 72 are each shunted by a resistor $R_3$. The ratio of $R_2$ to $R_3$ is preferably greater than about 50:1. This provides that, once optical switch 42 is discharged, the voltage across electrodes 48 and 49 is maintained sufficiently close to zero that crystal 46 causes essentially zero polarization rotation. Preferred values for $R_2$ and $R_3$ are about 10 Megohms (MΩ) and 150 Kilohms (K) respectively. A preferred value for $R_1$ is about 500 ohms (Ω).

Toroidal pulse transformers 70A and 70B are energized by amplifiers and control circuitry 74 in response to pulse signals $S_C$ and $S_D$ respectively. Synchronization of these signals with the RF voltage applied to gain-medium 32 is described below with continuing reference to FIG. 3 and additionally to FIGS. 4A–E. The synchronization is illustrated in a context of generating a burst of four laser-radiation pulses, with the laser operating in Q-switched mode (not cavity dumped).

Figures 4A, 4B, 4C, 4D, 4E:
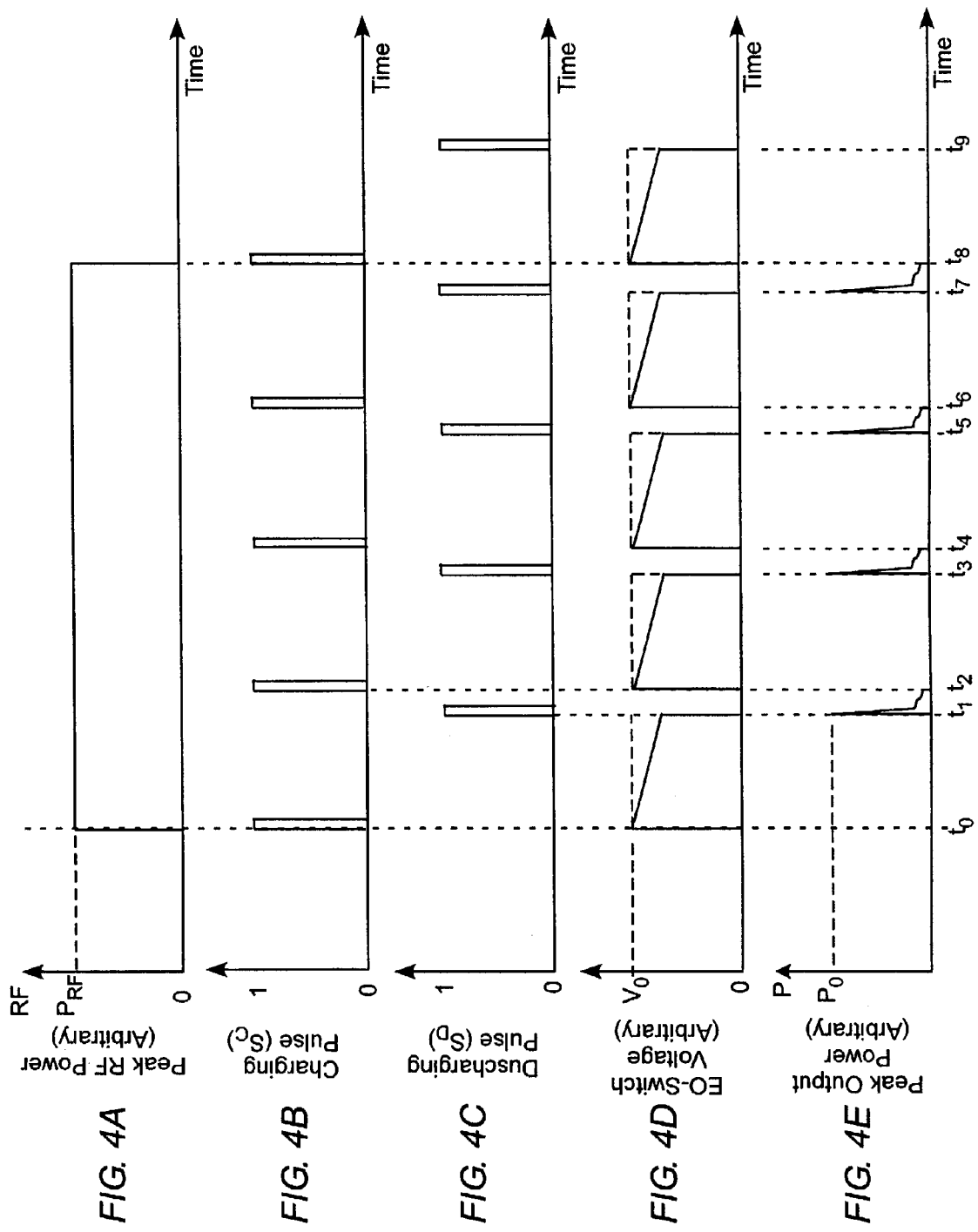
FIGS. 4A–E are graphs schematically illustrating relative timing of pulsed RF pump-power, Q-switching signals, and resulting Q-switched laser-radiation pulses in one preferred mode of operating the Q-switch arrangement of FIGS. 2A and 2B.

Referring first to FIGS. 4A and 4B, at time $t_0$, peak RF power PRF is applied (see FIG. 4A to gain-medium 32 and a switch-closing (E-0 switch charging) pulse $S_C$ is delivered (see FIG. 4B) to circuitry 74. The duration of the pulse $S_C$ is very much less than the desired temporal separation of pulses in the burst. Pulse $S_C$ causes the high DC voltage to be connected to E-O switch 42 for a similar duration. This duration is sufficient to charge E-O switch 42 (considered as a capacitor), leaving a maximum voltage $V_0$, initially, across the switch (see FIG. 4D). When pulse $S_C$ is terminated, the voltage across the switch falls with time as a result of leakage to ground through the chain of resistors $R_3$, while still remaining high enough to cause sufficient polarization rotation in crystal 46 to inhibit generation of laser-radiation, i.e., to maintain the switch in an activated state.

At time $t_1$, a switch-closing (E-O switch discharging) pulse $S_D$ is delivered (see FIG. 4C) to circuitry 74. This causes totem-pole switch 72 to discharge E-O switch 42 reducing the voltage across the switch (FIG. 4D) to essentially zero and allowing laser-radiation to be generated. The laser-radiation is released in the form of a pulse (see FIG. 4E) reaching a maximum power $P_0$ and then tailing off as stored energy in the gain-medium is depleted. Absent any other switching operation, the power would eventually be reduced to a CW level, representing an equilibrium between energy continually deposited in the gain-medium and laser energy continuously extracted from the gain-medium. Before this occurs, however, at time $t_2$, a pulse $S_C$ is delivered (see FIG. 4B) to circuitry 74, thereby re-applying voltage $V_0$ to optical switch 42 and preventing further delivery of laser-radiation. This cuts off what would otherwise be a long "tail" of the pulse. A second laser-radiation pulse is generated by delivering a pulse $S_C$ at time $t_3$ and a pulse $S_D$ at time $t_4$. A third laser-radiation pulse is generated by delivering a pulse $S_C$ at time $t_5$ and a pulse $S_D$ at time $t_6$. A fourth laser-radiation pulse is generated by delivering a pulse $S_C$ at time $t_7$ and a pulse $S_D$ at time $t_8$. Further, at time $t_8$, application of RF voltage to gain-medium 32 is terminated. At time $t_9$, after sufficient time has been allowed that there is insufficient energy stored in the gain-medium to cause generation of laser-radiation, a pulse $S_D$ is delivered to reduce the voltage across E-O switch to zero. It should be noted here that while the time between pulses is represented as being approximately the same, this should not be considered as limiting the present invention In the above-described method of operating laser 60, the power of any generated pulse will be dependent, among other factors, on the time that E-O switch 42 causes sufficient polarization rotation to prevent generation of laser-radiation, for example, $t_1$-$t_0$ or $t3$-$t_2$. This may be limited, inter alia, by the above-discussed voltage drop across the crystal as a result of leakage via resistors $R_3$. A method of controlling this voltage drop is described below with reference to FIGS. 5A–E.

Referring first to FIGS. 5A and 5B, at time $t_0$, peak RF voltage $P_{RF}$ is applied (see FIG. 5A) to gain-medium 32, and a switch-closing (E-O switch charging) pulse $S_{C0}$ is delivered (see FIG. 4B) to circuitry 74, as discussed above with reference to FIGS. 4A and 4B. Pulse $S_{C0}$ causes the high DC voltage to be connected to E-O switch 42 for a similar duration, thereby charging E-O switch 42, initially, to maximum voltage $V_0$ (see FIG. 5D). In the interval between time to at which energizing of the gain-medium begins and the time $t_1$ at which a pulse is desired, three further charging pulses $S_{C1}$, $S_{C2}$, and $S_{C3}$, are delivered (see FIG. 5B) to circuitry 74 at times $t_a$, $t_b$ and $t_c$, thereby causing the high DC voltage to be connected to E-(switch 42 three further times. Each, time the voltage across the E-O switch is restored to the maximum value $V_0$, having fallen from that value as a result of leakage via resistors $R_3$. The number of pulses, here four, and the interval between the delivery of sequential pulses in the train $S_{C0}$, $S_{C1}$, $S_{C2}$, and $S_{C3}$, for example $t_a$-$t_0$, is selected such that the voltage across E-O switch 42 does not fall below a value $V_L$, which is high enough to cause sufficient polarization rotation to prevent generation of laser-radiation.

At time $t_1$, a switch-closing (E-O switch charging) pulse $S_D$ is delivered (see FIG. 5C) to circuitry 74. This causes totem pole switch 72 to discharge E-O switch 42, as described above, reducing the voltage across the switch (FIG. 5D) to essentially zero and allowing laser-radiation to be generated. The laser-radiation is released in the form of a pulse (see FIG. 5E). This method of repeatedly charging E-O switch 42 provides that laser-radiation can be inhibited as long as is needed for reaching a desired energy level in gain-medium 32 for providing a desired peak Q-switched pulse power, or simply inhibited long enough to Aprovide any desired interval between pulses in a burst thereof.

In above-discussed laser 60, including inventive Q-switch arrangement 39, one object of the present invention is accomplished inasmuch as the Q-switch arrangement does not include a quarter-wave phase retarder between E-O switch 42 and resonator mirror 24. However, E-O switch 42 still includes antireflection coatings 54, which, as noted above, are the next-most optical damage prone components. Embodiments of the inventive Q-switch arrangement including E-O switch configurations from which one or both antireflection coatings are eliminated are described below with reference to FIGS. 6, 7, 9, 10, 12, 13, and 15. In each of these illustrations, polarization conditions are depicted for only the "closed" condition of switch 50, i.e., the condition in which the E-O switch 42 is activated, such that the switch functions as a quarter-wave phase-retarder. Those skilled in the art will recognize from the description of the present invention presented above with reference to FIGS. 2A and 2B what polarization conditions will be when there is no voltage applied to then optical switch.

It should also be noted that the improvements to the E-O switch illustrated in FIGS. 6, 7, 9, 10, 12, 13, and 15 can be used in any laser system requiring a similar type of Q-switch, including the prior art laser of FIG. 1.

Figure 6:
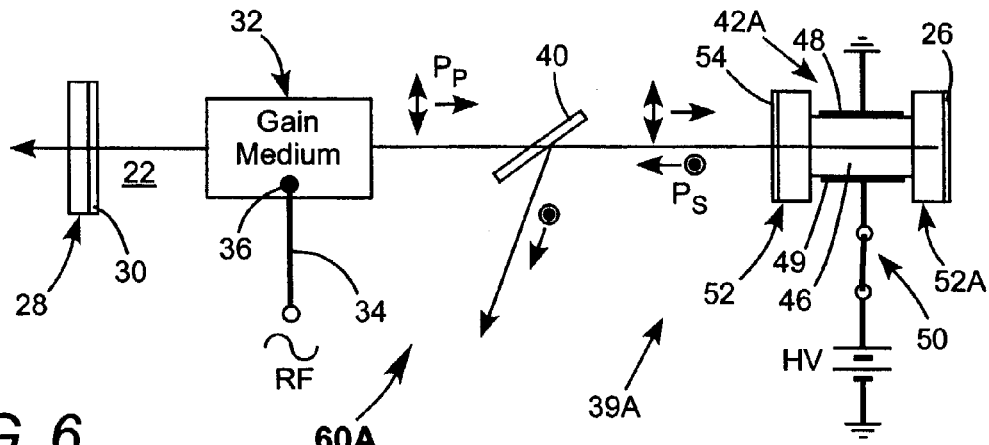
FIG. 6 schematically illustrates another preferred embodiment of a Q-switched $CO_2$ laser in accordance with the present invention, similar to the laser of FIGS. 2A and 2B but wherein one of the resonator mirrors is coated on a ZnSe window of the CdTe E-O switch.

Referring now to FIG. 6 with continuing reference to FIGS. 2A and 2B, another embodiment 60A of a laser in accordance with the present invention includes an RF-excited gain-medium 32 and a Q-switch arrangement 39A, including an E-O switch 42A and a thin film polarizer 40. E-O switch 42A is similar to E-O switch 42 of laser 60 with an exception that one antireflection-coated window 52 thereof is replaced by a widow 52A including a maximally reflective coating 26. E-O switch 42A is configured such that resonator 22 of laser 60A is formed between partially transmissive reflective coating 30 of mirror 28 and a maximally reflective coating 26 on window 52A of E-O switch 42A. Clearly, in laser 60A only one of the damage-prone antireflection coatings is eliminated. This may provide at best only a marginal improvement in reliability over that of laser 60.

Figure 7:
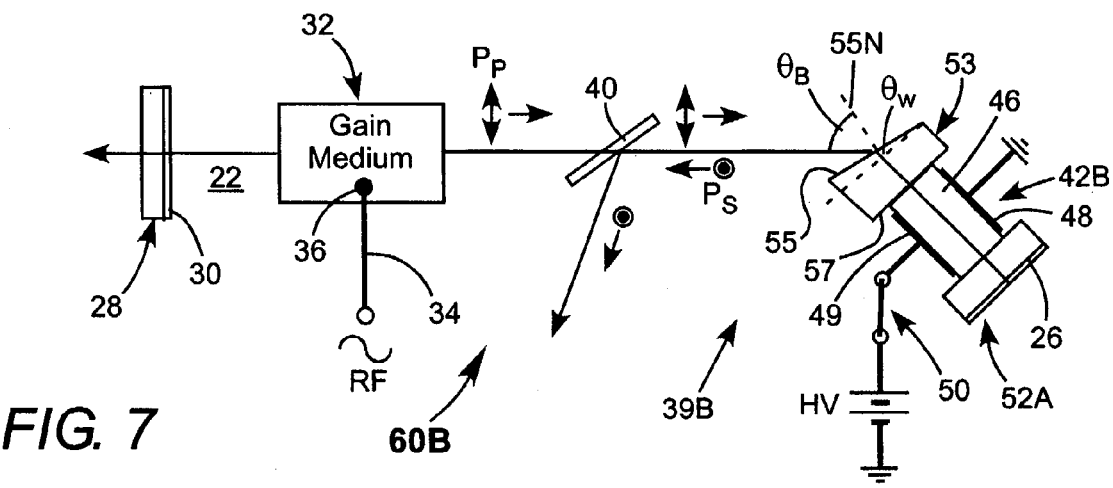
FIG. 7 schematically illustrates yet another preferred embodiment of a Q-switched $CO_2$ laser in accordance with the present invention, similar to the laser of FIG. 6 but wherein the CdTe E-O switch is oriented such that laser-radiation is incident on an uncoated other window thereof at the Brewster angle.

FIG. 7 schematically illustrates yet another embodiment 60B of a laser in accordance with the present invention. Laser 60B includes an RF-excited gain-medium 32 and a Q-switch arrangement 39B including an E-O switch 42B and a thin film polarizer 40. E-O switch 42B is similar to optical switch 42A of laser 60A with an exception that the one antireflection-coated window 52 thereof is replaced by a window 53 that does not include an antireflection coating, or a coating of any kind.

Window 53 has opposite surfaces 55 and 57 arranged at an angle (wedge-angle) $\theta_W$ to each other. E-O switch 42B is oriented such that laser-radiation is incident thereon at Brewster's angle $\theta_B$ to a normal 55N with surface 55. Accordingly, reflection for plane-polarized radiation $P_P$ from surface 55 is essentially zero and no antireflection coating is required. Wedge angle $\theta_W$ is preferably such that the sine thereof is equal to the sine of the Brewster angle, in air, for the window material divided by the refractive index of the material of window 53, i.e., $\theta_W$ is preferably the Brewster angle in the material of the window. This causes radiation to exit surface 57 of the window and traverse crystal 46 parallel to electrodes 48 and 49. By way of example, for a window made from ZnSe having a refractive index about 2.41 at the wavelength of radiation $P_P$. $\theta_B$ is about 67.4 degrees and $\theta_W$ is about 22.6 degrees.

Figure 8:
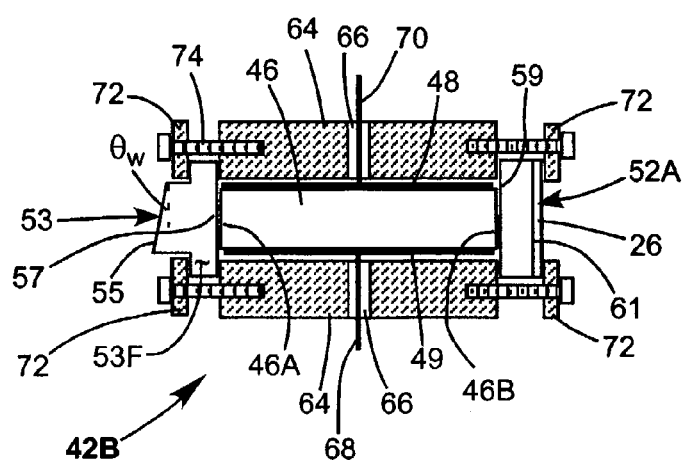
FIG. 8 is an elevation view, partly in cross-section, schematically illustrating assembly details of a preferred example of the CdTe E-O switch of FIG. 7

A preferred assembly arrangement for E-O switch 42B is schematically illustrated in FIG. 8 Here, CdTe crystal 46 and electrodes 48 and 49 in contact therewith is located between dielectric holding members 64. Each holding member 64 has an aperture 66 extending therethrough to allow electrical contact to be made to electrodes 48 and 49, here, via leads 70 and 68 respectively. Window 53 includes flanged portion 53F having a greater diameter than entrance surface 55 of the window. Entrance and exit surfaces 55 and 57 of the window are at an angle $\theta_W$ to each other where $\theta_W$ is the Brewster angle in the material of the window (about 22.6 degrees for ZnSe), as discussed above. Window 52A has maximally reflective coating 26 on surface 61 thereof.

Surface 59 of window 52A is uncoated. Windows 53 and 52A are clamped via clamps 72 and screws 74 inserted through the clamps into holding members 64, such that surface 57 of window 53 and surface 59 of window 52 are in thermal contact, and effectively in optical contact, with surfaces 46A and 46B respectively of crystal 46. The term effectively in optical contact, here, means that surfaces in thermal contact are sufficiently close that the airspace therebetween behaves as a single interface at all common $CO_2$ laser wavelengths.

Figure 9:
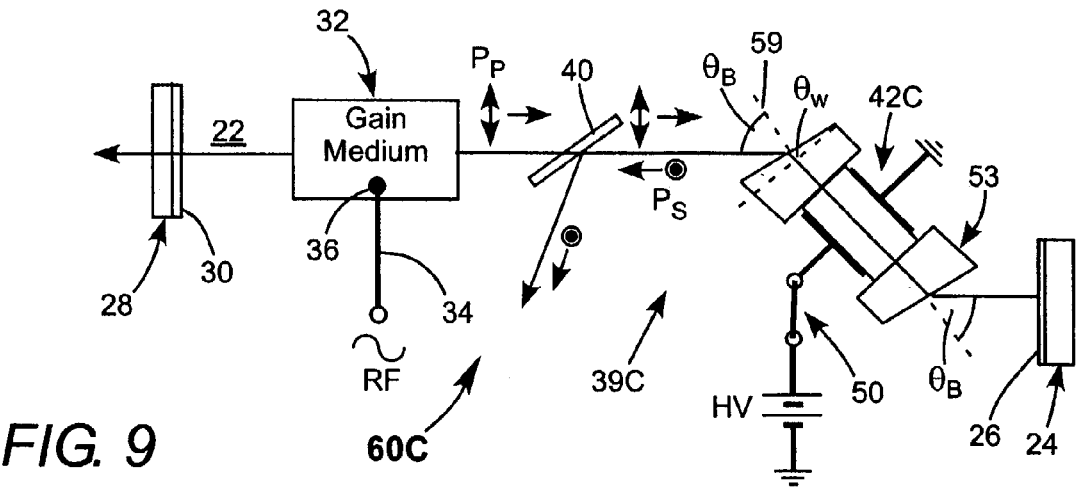
FIG. 9 schematically illustrates still another preferred embodiment of a Q-switched $CO_2$ laser in accordance with the present invention, the laser having a laser resonator formed between two mirrors, the resonator including a Q-switch arrangement including a CdTe E-O switch similar to the E-O switch of FIG. 7 but wherein both windows thereof are uncoated and oriented such that laser-radiation is incident thereon at the Brewster angle.

FIG. 9 schematically illustrates yet another embodiment 60C of a laser in accordance with the present invention. Laser 60C includes a laser resonator 22 formed between reflective coatings 26 and 30 of mirrors 24 and 28 respectively. The resonator includes an RF-excited gain-medium 32 and a Q-switch arrangement 39C including an E-O switch 42C and a thin film polarizer 40. E-O switch 42C is similar to optical switch 42 of laser 60 (see FIG. 2B) with an exception that the both antireflection-coated windows 52 thereof are replaced by above-described windows 53. The windows 52, here, are arranged with outer surfaces 55 thereof parallel to each other. E-O switch 42C is oriented such that radiation enters the switch at an incidence angle $\theta_B$ to surface 55 of one of the windows 53 and leaves the switch 42C at an incidence angle $\theta_W$ (in the window) to surface 55 of the other window 53.

Those skilled in the art will recognize that in this orientation, and in the orientation of FIG. 7, surfaces 55 of windows 53 will be reflective for circularly polarized light. However, as the circularly polarized light is created in E-O switch 42C only when it desired to prevent circulation of laser-radiation, this loss is advantageous rather than disadvantageous. When voltage across E-O switch 42 is reduced to zero to generate a laser pulse, no circularly polarized radiation is created, and only radiation in the $P_P$ orientation, for which there is essentially zero reflection at surfaces 55 of windows 53, circulates in the resonator.

Figure 10:
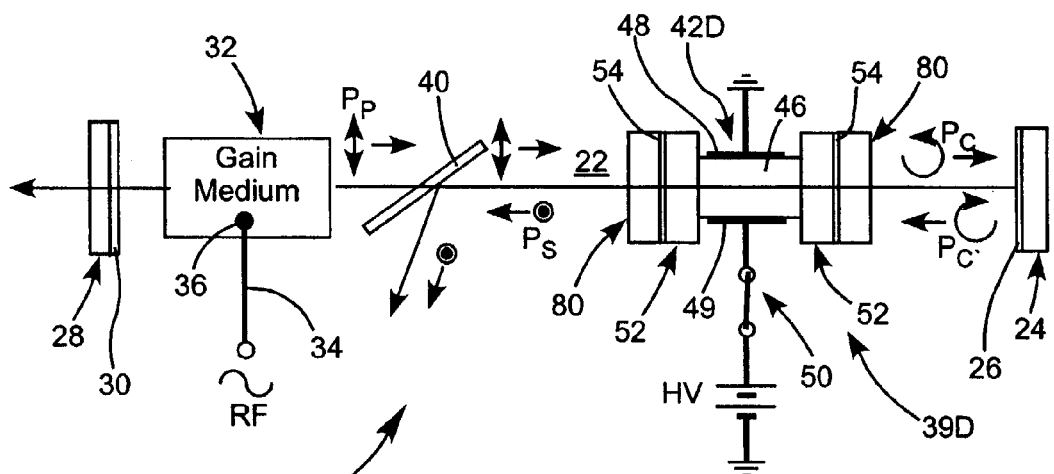
FIG. 10 schematically illustrates a further embodiment of the present embodiment of a Q-switched $CO_2$ laser in accordance with the present invention similar to the laser of FIGS. 2A and 2B but wherein the antireflection coated surfaces on the ZnSe windows of the E-O switch are protected by barium fluoride windows held in thermal contact with the antireflection coated surfaces.
Figure 11:
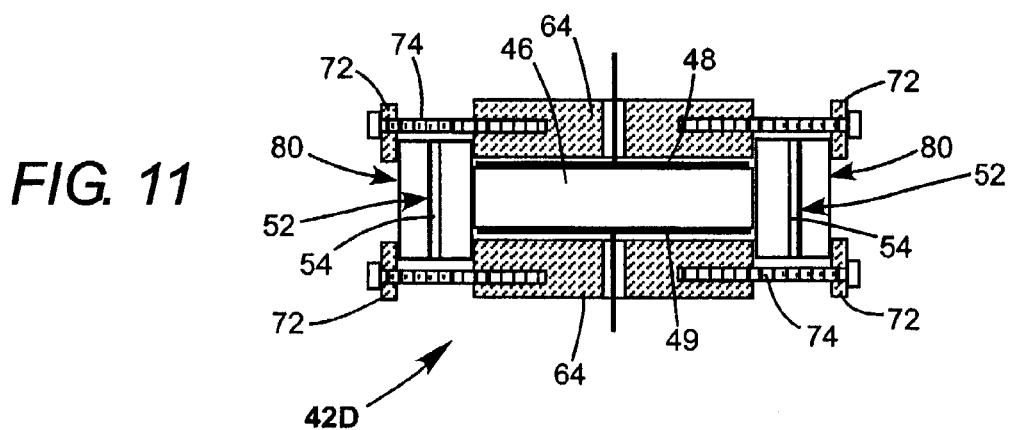
FIG. 11 is an elevation view, partly in cross-section, schematically illustrating assembly details of a preferred example of the CdTe E-O switch of FIG. 10.

FIG. 10 schematically illustrates a further embodiment 60D of a laser in accordance with the present invention. Laser 60D is similar in arrangement and operation to laser 60 of FIGS. 2A and 2B with an exception that switch arrangement 39 of laser 60 is replaced by a Q-switch arrangement 39D. Q-switch arrangement 39D is similar to Q-switch arrangement 39 with an exception that E-O switch 42 thereof is replaced by an E-O Switch 42D. E-O switch 42D is essentially an E-O switch 42 to which two barium fluoride ($BaF_2$) windows 80 have been added. Each barium fluoride window is held in thermal contact, and effective optical contact, with antireflection coating 54 on a corresponding ZnSe window 52. A preferred assembly arrangement of E-O switch 42D is schematically illustrated in FIG. 11. The assembly arrangement is similar to the assembly arrangement of E-O switch 42B depicted in FIG. 8 with an exception that clamps 72 hold a $BaF_2$ window 80 in contact with the corresponding ZnSe window52 in addition to holding the ZnSe window in contact with CdTe crystal 46. Windows 80 preferably have opposite surfaces thereof arranged about parallel to each other.

In one experiment, a $BaF_2$ window 80 having a thickness of about 1.0 mm was deployed on antireflection coated ZnSe windows having a thickness of about 3.0 mm in an E-O switch 42D. This raised the damage threshold of antireflections coatings 54 above the damage of unprotected antireflection coatings of an E-O switch 42 (without $BaF_2$ windows) operated in the same laser. The increase in damage threshold, however, was achieved at the expense of a 14% reduction in peak pulse power for the same RF power applied to gain-medium 32.

It is believed, without being limited to a particular theory, that the power reduction is a result of the optical efficiency or effectiveness of antireflection coatings 54 being reduced by one or both of the $BaF_2$ windows. The antireflection coatings 54 in ZnSe windows 52 of the experiment were designed to impedance-match the refractive index of ZnSe (about 2.4 at the laser-radiation wavelength) to the refractive index of air (1.0). Accordingly, the effectiveness of the antireflection coatings would most effectively be preserved if both windows 80 had an optical thickness (physical thickness multiplied by refractive index) of an integer multiple of one-half wavelength at the laser-radiation wavelength. In this case, the windows would have an effective refractive index of 1.0, independent of the refractive index of the window material. This was probably not achieved in the experiment.

If a window 80 is sufficiently thick, for example greater than about 0.5 mm thick, there will be some wavelength sufficiently close to a peak-gain wavelength of the gain-medium, at which the window is an integer multiple of one-half wave thick. This being achieved, all else being equal, that wavelength will become the laser-radiation wavelength. Any absorption loss in the window material, however, will reduce the laser power.

At this thickness of windows 80, it is not necessary that the windows have any exact thickness, however, if they do not, reflection losses due to the windows may not be minimized. It is also preferable that the windows are matched in optical thickness to within about one-tenth wavelength at about the laser-radiation wavelength. If the thicknesses of the windows are not matched, it may not be possible to find a common half-wave multiple for both windows that is close to the desired operating wavelength of the laser. Thickness matching may be achieved by fabricating a window blank having surfaces parallel and flat to within a tenth-wavelength and having a surface area large enough to accommodate two windows 80. Two parallel-surfaced, optical-thickness-matched windows can then be cut from the finished blank.

If the absorption coefficient of a selected window material is such that it is not practical to make a window sufficiently thick to meet the above discussed criterion than it will be preferable to manufacture the window to an exact thickness to ensure that the optical thickness thereof will be an integer multiple of a half wavelengths at the operating wavelength. By way of example, even if $BaF_2$ window has a thickness of only about 1.0 mm it will be about 300 half-wavelengths thick at a wavelength of 10000 nm. In this case a window can be initially fabricated and measured in an infrared spectrophotometer having a suitably high resolution. The measurement will indicate a series of peaks and troughs of transmission the peaks being at wavelengths at which the window is an integer multiple of half-wavelengths thick. If the desired lasing wavelength does not coincide with the wavelength position of one of the peaks, the wavelength separation of the desired wavelength and the peak at the longer wavelength is calculated as a percentage of the wavelength separation between adjacent peaks. This will represent the fraction of one-half wave optical thickness that must be removed from the window to align a transmission peak with the desired wavelength. This amount can then be polished off the window thickness to bring the window to a correct thickness. If windows are made to a precise thickness as described, then, in theory at least, two windows can have a different optical thickness, provided that each optical thickness is an odd multiple of half-waves thick at the desired lasing wavelength.

Figure 12:
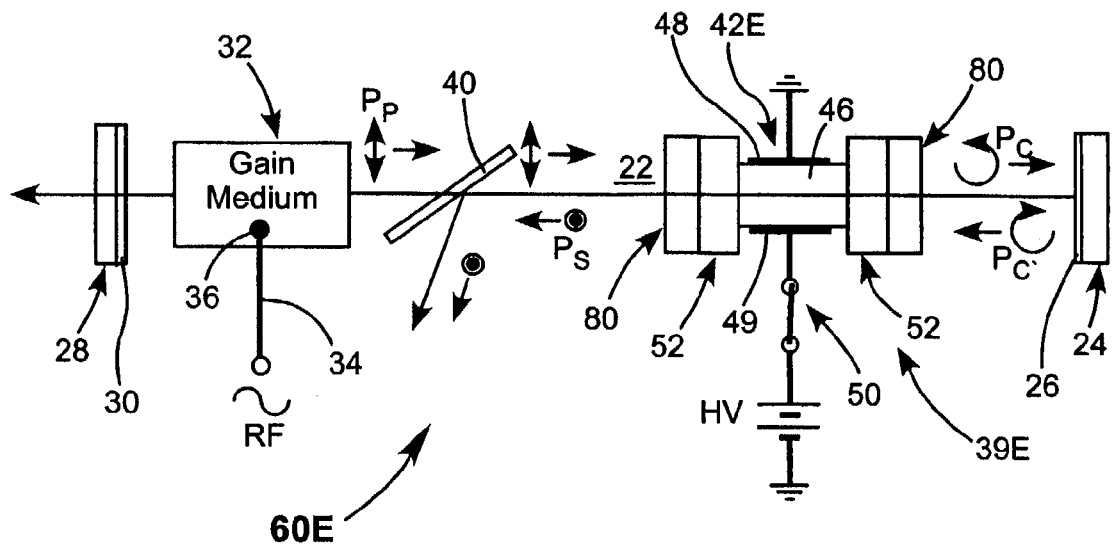
FIG. 12 schematically illustrates still yet another embodiment of the present embodiment of a Q-switched $CO_2$ laser in accordance with the present invention similar to the laser of FIG. 10 but wherein the ZnSe windows of the E-O switch do not include an antireflection coating, and each barium fluoride window is held in thermal contact with the an uncoated surface of the corresponding zinc selenide window.

Referring now to FIG. 12, still another embodiment 60E of a laser in accordance with the present invention is illustrated. Laser 60E is similar to above-discussed laser 60D with an exception that Q-switch arrangement 39D of laser 60D including E-O switch 42D is replaced by a Q-switch arrangement 39E including an E-O switch 42E. E-O switch 42E is similar to E-O switch 42D with an exception that ZnSe windows 52 do not include an antireflection coating 54.

Windows 80 in E-O switch 82 are preferably made from a material having a refractive index equal to or close to the square root of the refractive index of CdTe, or whatever other material is selected for crystal 46. If the refractive index of the window material is equal to the square root of the refractive index of the material of crystal 46 then window 80 will act as an antireflective device, providing zero reflection from a crystal surface at wavelengths for which the optical thickness of the window is an odd integer multiple of quarter-wavelengths. If the window is made sufficiently thick, there will be at least one wavelength sufficiently close to a peak-gain wavelength of the gain-medium at which the window is an odd integer multiple of quarter-waves in optical thickness. Preferably windows 80 have a physical thickness greater than 0.02 mm, and more preferably greater than 0.5 mm. A preferred range of thicknesses is between about 0.5 mm and 2.0 mm. Here again, windows 80 preferably have opposite surfaces thereof about parallel to each other and are preferably matched in optical thickness to within about one-tenth wavelength at about the laser-radiation wavelength. If the thicknesses of the windows are not so matched, it may not be possible to find a common odd quarter-wave multiple for both windows that is close to the desired lasing wavelength.

The windows may also be made to a precise optical thickness for a specific lasing wavelength as discussed above. Here, however, it is a trough of transmission in the window that must be aligned with the desired wavelength as the troughs of transmission occur at wavelengths at which the window is an odd integer multiple of quarter-wavelengths thick.

It should be noted here that while it is most preferable that the material of windows 80 in optical switches 42E should be of a material having a refractive index which is about the square root of the refractive index of the material of windows 52 (the ideal value), it may not be possible to find a suitable material having such a refractive index. However, any material having a refractive index between about 25% less than and 50% greater than the square root of the refractive index of the material of window 52 can provide a significant reduction in reflection. More preferably, the window is of a material having a refractive index between about 10% less than and 10% greater than the square root of the refractive index of the material of window 52. By way of example, $BaF_2$ has a refractive index of about 1.41 at a wavelength of 9500 nanometers (nm). This is about 7% less than ideal value (1.55) for ZnSe having a refractive index of about 2.41 at the same wavelength. An odd-multiple quarter-wavelength of $BaF_2$ would reduce the reflectivity of a surface of a ZnSe window 52 from about 16.9% to about 0.9%. Silver bromide (AgBr) has a refractive index of about 1.98 at a wavelength of 9500 nm. This is about 28% greater than ideal value for a ZnSe window. Nevertheless, an odd multiple quarter-wavelength of AgBr would reduce the reflectivity from a surface of a ZnSe window 52 from about 16.9% to about 5.8%.

Figure 13:
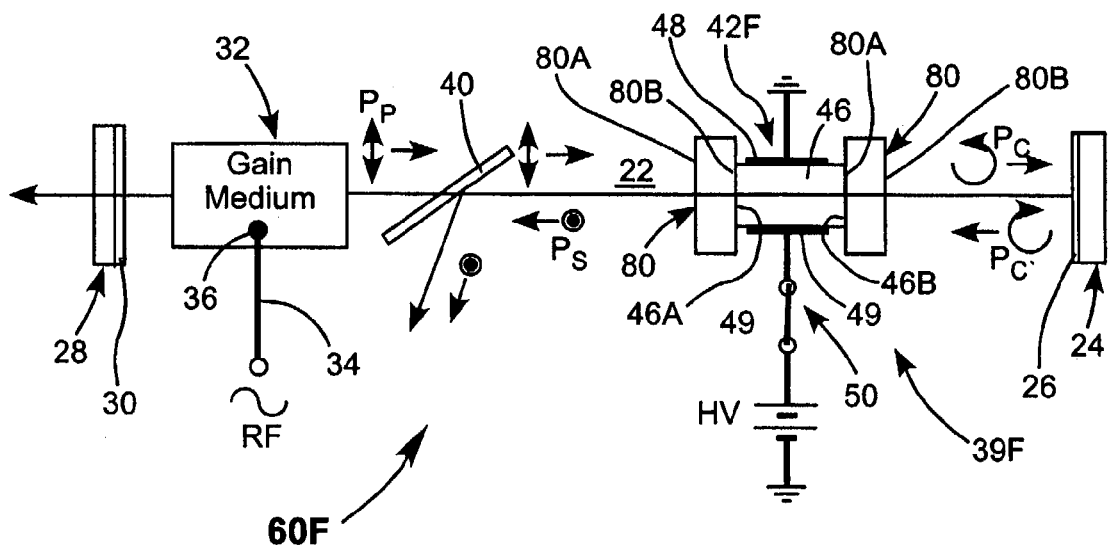
FIG. 13 schematically illustrates still a further embodiment of the present embodiment of a Q-switched $CO_2$ laser in accordance with the present invention similar to the laser of FIGS. 2A and 2B but wherein the antireflection coated surfaces on the ZnSe windows of the E-O switch are replaced by cesium bromide windows and held in thermal contact with the cadmium telluride E-O switch.

Referring now to FIG. 13, still a further embodiment 60F of a laser in accordance with the present invention is illustrated. Laser 60F is similar to above-discussed laser 60E with an exception that Q-switch arrangement 39E of laser 60E including E-O switch 42E is replaced by a Q-switch arrangement 39F including an E-O switch 42F. E-O switch 42E is similar to E-O switch 42D with an exception that ZnSe windows 52 omitted and replaced with windows 80, preferably of a material having a refractive index which is between about 25% less than and 50% greater than the square root of the refractive index of the material of crystal 46, and most preferably, of course about equal to the square root of the refractive index of the material of crystal 46. Surface 80B of one window 80 is in thermal contact (and effectively in optical contact) with surface 46A of crystal 46. Surface 80A of the other window 80 is in thermal contact (and effectively in optical contact) with surface 46B of crystal 46. Here again, windows 80 are preferably sufficiently thick that there will be at least one wavelength close to the desired operating wavelength of the laser at which the windows have an odd multiple of quarter-waves optical thickness. The windows are also preferably matched in optical thickness to within about one-tenth wavelength at about the laser-radiation wavelength, for reasons discussed above. Thinner windows may be made to be an odd multiple of quarter-waves thick at a desired wavelength as described above.

Materials suitable for windows 80 in either E-O switch 42E or E-O switch 42F include, but are not limited to, cesium bromide (CsBr), barium fluoride ($BaF_2$), cesium iodide (CsI), potassium bromide (KBr), potassium chloride (KCl), silver chloride (AgCl), sodium chloride (NaCl), zinc sulfide (ZnS), and silver bromide (AgBr). Optical and physical properties of these materials are well known in the art to which the present invention pertains.

Preferred materials for a window 80 in contact with ZnSe, for example in optical switch 42E of laser 60E, are $BaF_2$ and KCl. Both of these materials have refractive indices within 10% of the ideal value and are non hygroscopic. Preferred materials for a window 80 in contact with CdTe, for example in optical switch 42F of laser 60F, are CsBr, CsI, KBr, and NaCl. All of these materials have refractive indices within 10% of the ideal value for CdTe, however the materials are hygroscopic. An alternative preferred material for a window 80 of E-O switch 42F is KCl. This has a refractive index 10.9 percent less than the ideal value for CdTe, but is not hygroscopic. A window 80 of KCl could reduce the reflectivity of a surface of a CdTe window from about 21% to about 1.6%. Potential problems of using hygroscopic windows can be minimized by installing theses widows in a suitably purged and sealed enclosure as part of a laser housing.

Figure 14:
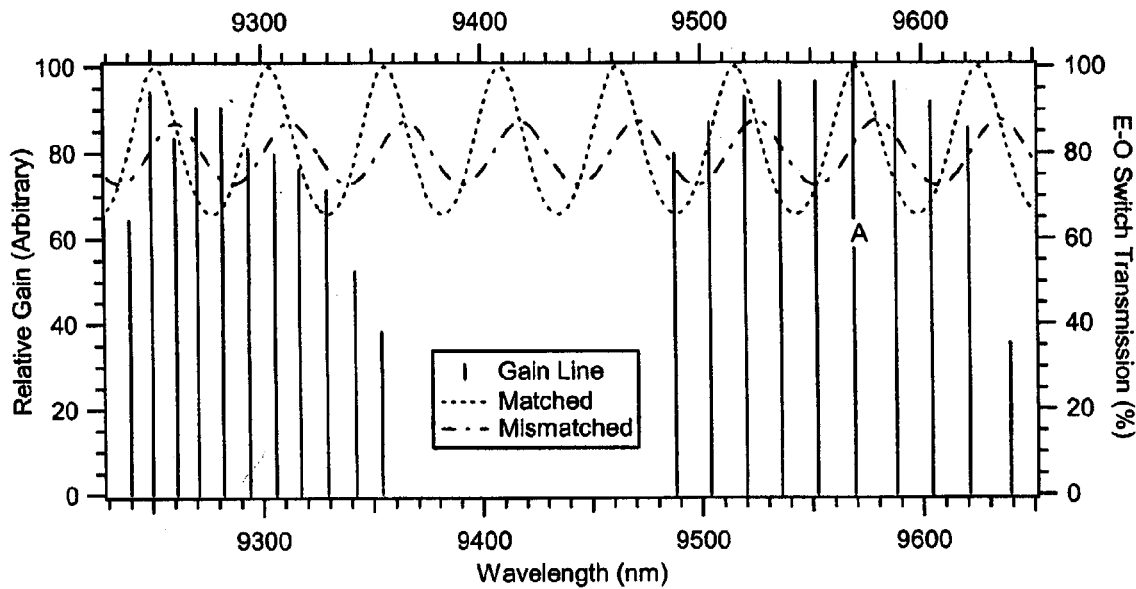
FIG. 14 is a graph schematically illustrating approximate relative gain of strong gain lines of a $CO_2$ laser in two different wavelength ranges, and computed transmission as a function of wavelength of a CdTe crystal having 0.5 millimeter thick CsBr windows in thermal contact with entrance and exit surfaces thereof.

FIG. 14 is a graph schematically depicting relative gain of groups of strong gain-lines of a $CO_2$ laser in a first wavelength region between about 9230 nm and 9360 nm and a second wavelength region between about 9480 nm and 9650 nm. Also depicted by dotted and dashed curves are the computed relative transmissions as a function of wavelength of an E-O switch 42F including a CdTe crystal 46 bounded by two CsBr windows 80 each having thickness of 0.5 mm exactly (dotted curve), i.e., a matched thickness, and a CdTe crystal 46 bounded by two CsBr windows 80 one having an arbitrarily selected thickness of 0.5 mm and the other having a thickness of 0.501 mm (dashed curve), i.e., a mismatched thickness.

It can be seen from the dotted curve of FIG. 14 that at least one gain line in each wavelength region is at a wavelength very close to a transmission peak of the E-O switch and has a transmission close to 100%, even though the thickness of the windows is arbitrarily selected. The most likely lasing wavelength in this case would be at 9569 nm, where the strongest gain line in the second wavelength region, here, designated line "A", aligns very closely with a transmission maximum of the E-O switch. It can be seen from the dashed curve of FIG. 14 that the mismatch in window thickness causes the peak transmission of the E-O switch to be reduced to a value of about 87%. With this particular combination of window thicknesses, the most likely lasing wavelength would again be at 9569 nm (gain-line A). The strength of this gain line, relative, to others in the two groups, compensates for the fact that it is not aligned with a transmission peak of the switch. Laser output power, however, could be expected to be only about 82% of that available in the case where the window thicknesses are matched.

Figure 15:
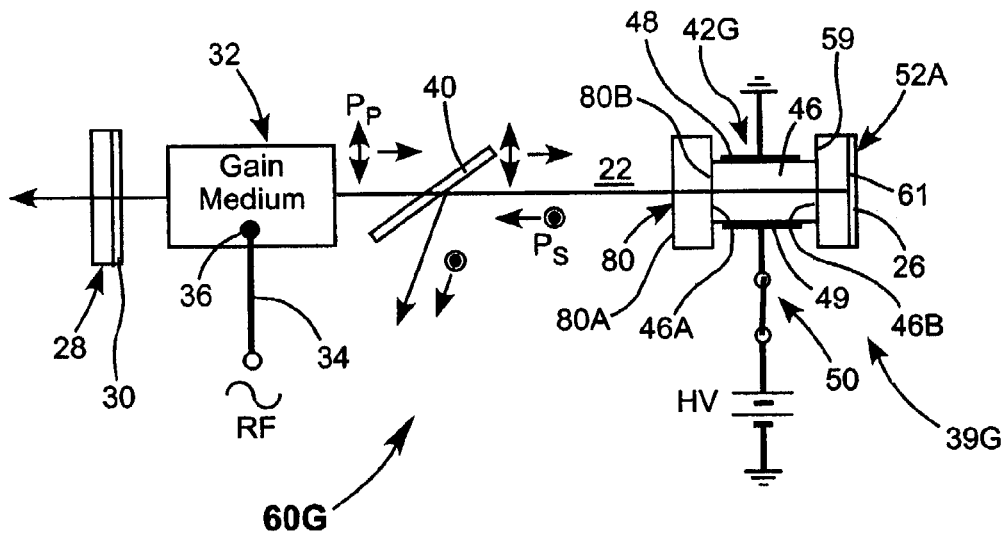
FIG. 15 schematically illustrates still yet a further embodiment of a Q-switched $CO_2$ laser in accordance with the present invention similar to the laser of FIG. 13 but wherein the cadmium telluride E-O switch includes a cesium bromide window and a ZnSe window in held in thermal contact therewith, the ZnSe window includes a reflective coating forming one end-mirror of the laser resonator.

Referring now to FIG. 15, still yet a further embodiment 60G of a laser in accordance with the present invention is illustrated. Laser 60G is similar to above-discussed laser 60F with an exception that Q-switch arrangement 39F of laser 60F including E-O switch 42F is replaced by a Q-switch arrangement 39G including an E-O switch 42G. Laser 60G does not include a separate resonator mirror 24.

E-O switch 42G includes, at one end thereof, a ZnSe window 52A. Surface 61 of window 52A includes a reflective coating 26 forming an end mirror of resonator 22. Surface 59 of window 52A is in thermal contact with surface 46B of crystal 46. At an opposite end of the E-O switch is a window 80, in thermal contact with crystal 46, and having preferred characteristics as discussed above. This avoids the above-discussed potential problem of a thickness mismatch in two windows 80 in the arrangement of E-O switch 42F, and reduces the potential loss due to misalignment of reflection minimum of the window with a lasing wavelength.

Figure 16A:
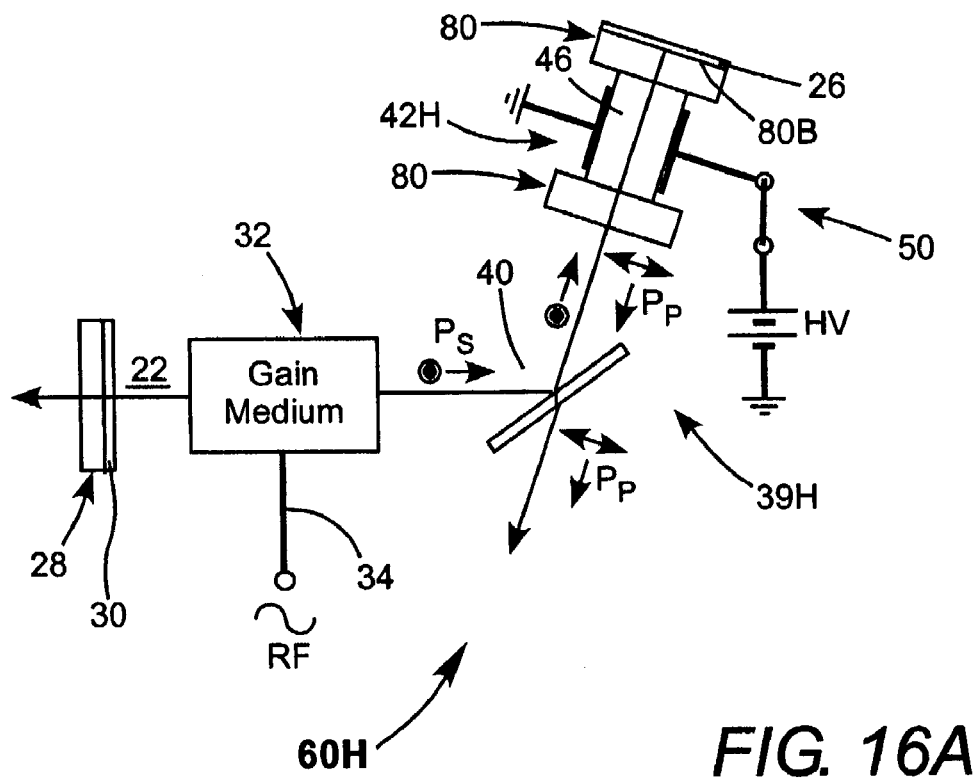
FIGS. 16A and 16B schematically illustrate yet one more embodiment of a Q-switched $CO_2$ laser in accordance with the present invention, similar to the laser of FIG. 15, but wherein a resonator and components thereof are arranged such that laser-radiation circulates in a different polarization orientation.
Figure 16B:
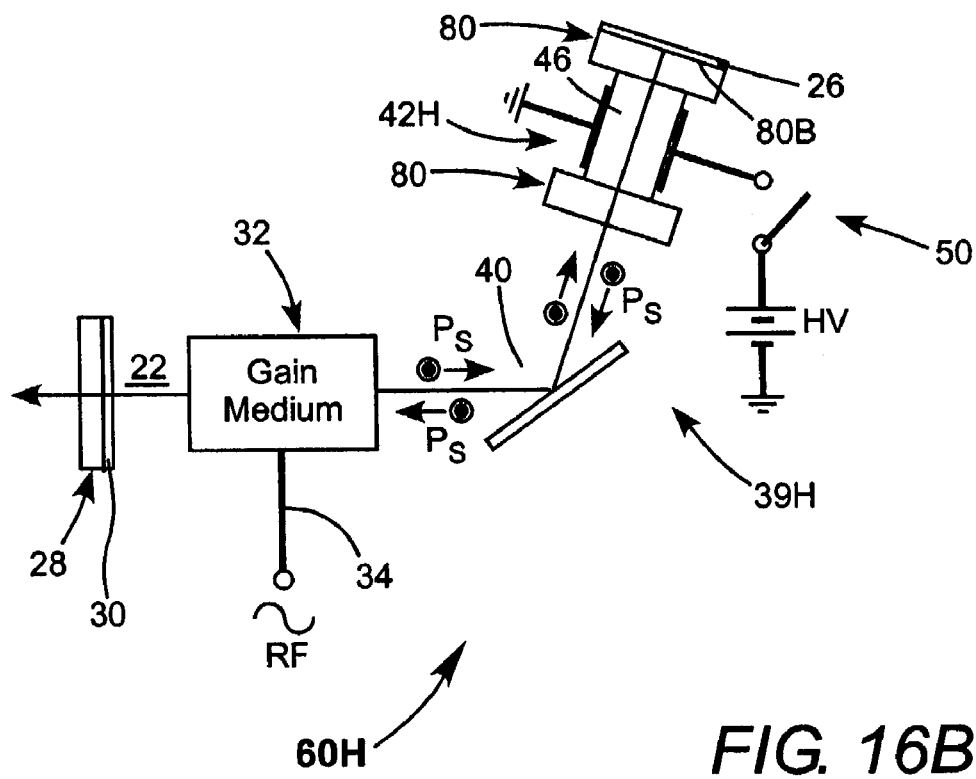

FIGS. 16A and 16B schematically illustrate yet one more embodiment 60H of a pulsed Q-switched laser in accordance with the present invention. Laser 60H is similar to above-discussed laser 60G with an exception that Q-switch arrangement 39G of laser 60G including E-O switch 42G is replaced by a Q-switch arrangement 39H including an E-O switch 42H. Laser 60H also does not include a separate resonator mirror 24.

E-O switch 42H is similar to E-O switch 42G of laser 60G with an exception that ZeSe window 52A including reflective coating 26 is replaced by a window 80 including a reflective coating 26 forming an end mirror of resonator 22. The other resonator mirror is mirror 28.

A further difference between laser 60H and laser 60G is that, in laser 60H, gain-medium 32 is rotated such that laser-radiation generated thereby is plane polarized in a $P_S$ orientation with respect to thin film polarizer 40. When switch 50 is closed and the capacitance of E-O switch 42H is charged, laser-radiation makes a forward and reverse pass through the E-O switch and the polarization orientation is changed from $P_S$ to $P_P$. $P_P$ polarized radiation is transmitted by thin film polarizer 40, thereby restricting circulation and build up of the energy of laser-radiation in resonator 22. When switch 50 is opened, there is no change in polarization orientation of the laser-radiation and the laser-radiation can circulate and build up in the resonator. Those skilled in the art will recognize without further illustration or description that any other above-described embodiment of a laser in accordance with the present invention may be reconfigured to operate such that radiation circulating in the resonator is reflected from thin film polarizer 40 rather than being transmitted by the thin film polarizer.

It should be noted here that all embodiments of the present invention described above may be operated in a conventional Q-switched mode, with pulses delivered from a partially transmissive resonator end mirror, or may be operated in a Q-switched, cavity-dumped mode. In the cavity-dumped mode, mirror 28 (common to all embodiments) may be replaced by a fully reflective mirror and laser-radiation delivered from the resonator, after a predetermined circulation time therein, by reclosing switch 50, thereby causing the radiation built up in the resonator to be reflected out of the resonator by thin film polarizer 40 in a $P_S$ polarization orientation.

The present invention is described above in terms of a preferred and other embodiments. The invention however, is not limited to the embodiments described and depicted. Rather the invention is limited by the claims appended hereto.

What is claimed is:

1. An optical assembly arranged to transmit laser-radiation, comprising:
   an active optical crystal having first and second opposite surfaces;
   first and second windows each thereof having first and second opposite surfaces;
   said second surface of said first window being in thermal contact with said first surface of said active optical crystal, and first surface of said second window being in thermal contact with said second surface of said active optical crystal;
   said first surface of said first window being uncoated and with the thickness of said first window being at least 0.02 mm; and
   wherein at least said first window is formed from a material having a refractive index between about 10% less than and 10% greater than the square root of the refractive index of the material of said active optical crystal.

2. The optical assembly of claim 1, wherein said active optical crystal is a CdTe crystal.

3. The optical assembly of claim 2, wherein said first window is formed from a material having a refractive index that is substantially equal to the square root of the refractive index of the material of said active optical crystal.

4. The optical assembly of claim 3, wherein said second window is formed from a material having a refractive index that is substantially equal to the square root of the refractive index of the material of said active optical crystal.

5. The optical assembly of claim 3, wherein said second window is formed from a material having a refractive index similar to the refractive index of the material of said active optical crystal.

6. The optical assembly of claim 5, wherein said active optical crystal is a CdTe crystal and said second window is formed from ZnSe.

7. The optical assembly of claim 5, wherein said second window has a reflective coating on said second surface thereof.

8. The optical assembly of claim 1, wherein said active optical crystal is a CdTe crystal and said first window is formed from a material selected from the group of materials consisting of CsBr, CsI, KBr, and NaCl.

9. The optical assembly of claim 1, wherein said first and second windows have about the same optical thickness.

10. The optical assembly of claim 9, wherein the optical thickness of said first and second windows are matched to within one-tenth of a wavelength at the wavelength of the laser-radiation.

11. The optical assembly of claim 1, wherein each of said first and second windows has an optical thickness about equal to an odd integer multiple of quarter-wavelengths at the wavelength of the laser-radiation.

12. The optical assembly of claim 1, wherein said first and second surfaces of said first optical window are about parallel to each other.

13. An optical assembly arranged to transmit laser-radiation, comprising:
   an active optical crystal of CdTe having first and second opposite surfaces;
   a first window having first and second opposite surfaces, said first surface being uncoated, said second surface of said first window being in thermal contact with said first surface of said active optical crystal, said first window having a thickness greater than 0.5 millimeters and being formed from a material selected from the group of materials consisting of CsBr, CsI, KBr KCl and NaCl; and
   a second window formed from ZnSe and having first and second opposite surfaces, said first surface of said second window being in thermal contact with said second surface of said active optical crystal, said second surface of said second window having a reflective coating thereon.

14. The optical assembly of claim 13, wherein said first window has an optical thickness about equal to an odd integer multiple of quarter-wavelengths at the wavelength of the laser-radiation.

15. An optical assembly arranged to transmit laser-radiation, comprising:
   an active optical crystal having parallel first and second opposite surfaces;
   first and second windows each having first and second opposite surfaces, and with the thickness of said first window being at least 0.02 mm;
   said second surface of said first window being in thermal contact with said first surface of said active optical crystal and with the second surface of said first window being uncoated, and first surface of said second window being in thermal contact with said second surface of said active optical crystal,; and
   wherein said first and second surfaces of said first window are inclined at a non-zero angle $\theta_W$ with respect to each other such that when radiation is incident upon the first surface of the first window at an angle $\theta_B$ there is substantially no reflection of plane polarized radiation from the first surface of the first window.

16. The optical assembly of claim 15, wherein said active optical crystal is formed of CdTe and at least said first window is formed from ZnSe.

17. The optical assembly of claim 16, wherein said second face of said second window has a reflective coating thereon.

18. The optical assembly of claim 15, wherein said second window is formed from ZnSe and said first and second surfaces thereof are inclined at an angle of about 22.6 degrees to each other, and wherein said first surface of said first window and said second surface of said second window are about parallel to each other.

19. An optical assembly arranged to transmit laser-radiation, comprising:
   an active optical crystal of CdTe first and second windows mounted into thermal contact with opposed ends of the active optical crystal, with the free end of the first window being uncoated and with the thickness of said first window being at least 0.02 mm and wherein said first window is formed from a material selected from the group of materials consisting of CsBr, CsI, KBr, KCl and NaCl.

20. An optical assembly arranged to transmit laser-radiation, comprising:
   an active optical crystal;
   first and second windows mounted into thermal contact with opposed ends of the active optical crystal;
   a third window mounted into thermal contact with the free end of the first window and with the free end of the third window being uncoated and with the thickness of said third window being at least 0.02 mm and wherein said third window is formed from a material having a refractive index between about 10% less than and 10% greater than the square root of the refractive index of the material of said first window.

21. An optical assembly arranged to transmit laser-radiation, comprising:
   an active optical crystal formed from CdTe;
   first and second windows mounted into thermal contact with opposed ends of the active optical crystal and being formed from ZnSe;
   a third window mounted into thermal contact with the free end of the first window and with the free end of the third window being uncoated and with the thickness of said third window being at least 0.02 mm and wherein said third window is formed from a material selected from the group of materials consisting of $BaF_2$, CsBr, CsI, KBr, KCl and NaCl.

* * * * *